United States Patent Office 3,266,085
Patented August 16, 1966

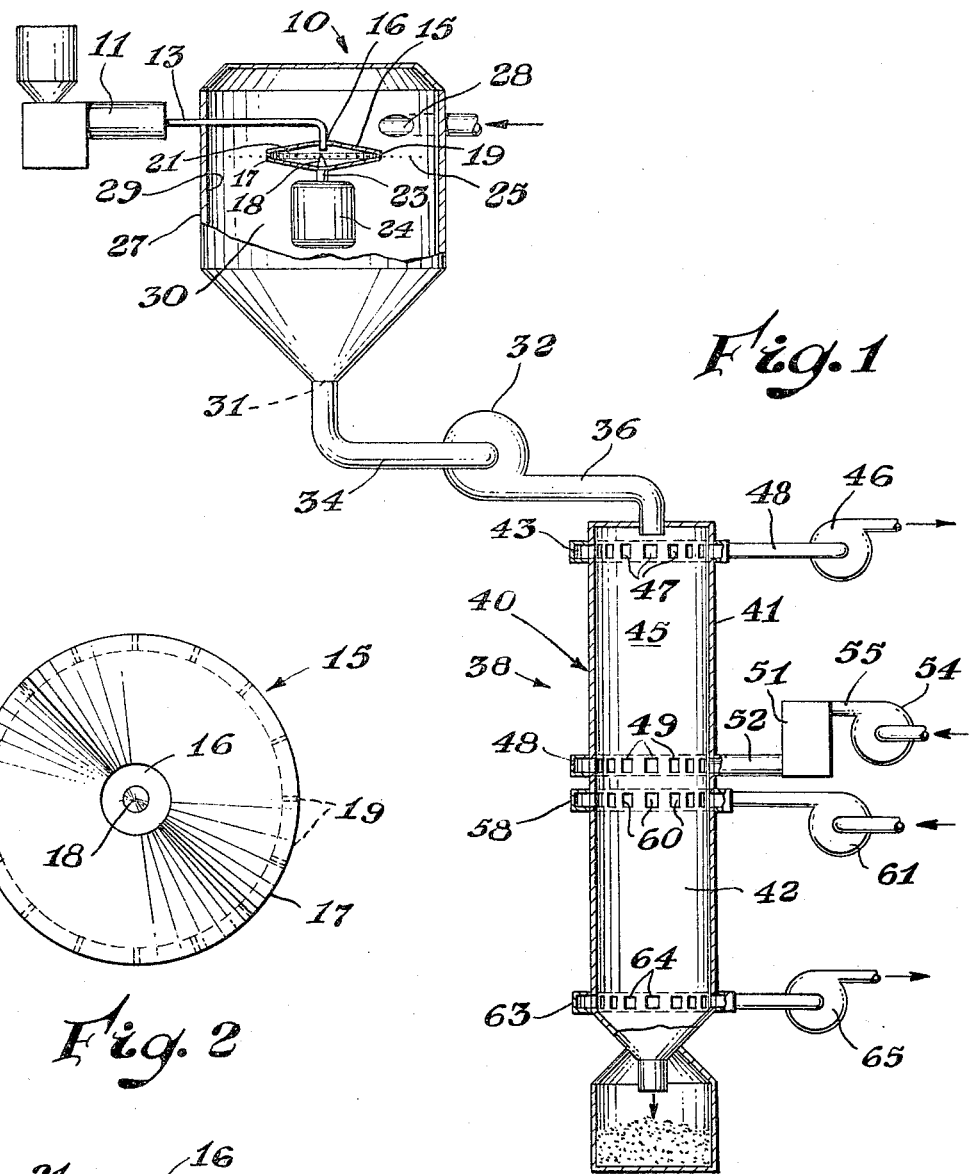
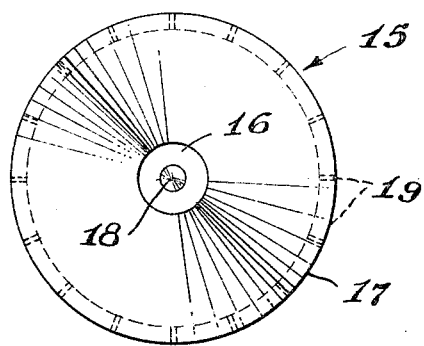
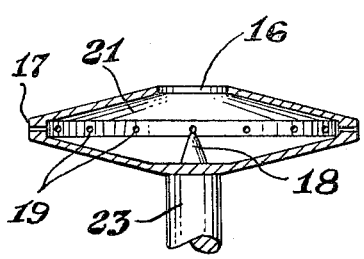

3,266,085
APPARATUS TO MANUFACTURE PARTICULATE THERMOPLASTIC RESINOUS MATERIAL
Kenneth F. Nacke, Saginaw, Mich., assignor to The Dow Chemical Company, Midland, Mich., a corporation of Delaware
Filed Mar. 20, 1964, Ser. No. 353,449
3 Claims. (Cl. 18—2.6)

This invention relates to processing apparatus. It more particularly relates to a centrifugal extrusion apparatus for the preparation of granular material.

In the preparation of thermoplastic resinous molding compositions usually the polymeric material in molten form is extruded through a die as a strand or a plurality of strands which is subsequently cooled and cut into granules by means of a grinder or similar mechanism. The granules represent a widely useable form of the polymeric material having a relatively low surface per unit of volume and may be readily utilized in injection molding equipment, extrusion equipment, and the like. Frequently, polymeric materials are polymerized in suspension or emulsion and the resultant product has relatively high surface and a low bulk density. Equipment suited for transforming either mass, emulsion or suspension polymer into suitable molding granules is usually expensive, complicated, and requires relatively high maintenance. The polymeric material must be heated to a molten condition and be forced under pressure through one or more suitable orifices, the extrude is then cooled and subsequently comminuted to a suitable size.

It is an object of this invention to provide an improved apparatus for the preparation of a particulate thermoplastic resinous material.

It is another object of this invention to provide a simplified apparatus for the preparation of molding granules.

It is a further object of this invention to provide a centrifugal apparatus for the preparation of granules.

These benefits and other advantages in accordance with the present invention are achieved by forcing a molten thermoplastic resinous material in heat plastified condition through a die by means of centrifugal force and withdrawing the molten thermoplastic resinous material from the die by means of centrifugal force, the centrifugal force being sufficient to cause melt fracture of the extrude into a plurality of particles.

Apparatus in accordance with the present invention comprises means to supply a heat plastified thermoplastic resinous material in cooperative combination with a rotor, the rotor comprising a generally circular body defining an internal cavity, a plurality of circumferenetial passageways, the passageways providing a means of communication between the cavity and the periphery of the rotor, means to rotate said rotor at a speed sufficient to cause melt fracture of the thermoplastic resionus material.

Further features and advantages of the invention will become more apparent from the following specification when taken in conjunction with the drawing wherein:

FIGURE 1 is a schematic cutaway representation of an apparatus in accordance with the invention;

FIGURES 2 and 3 are detailed views of a rotor utilized in the apparatus of FIGURE 1.

In FIGURE 1 there is schematically represented an apparatus generally designated by the reference numeral 10. The apparatus 10 comprises in cooperative combination an extruder 11 which acts as a source of heat plastified thermoplastic resinous material, a conduit 13 in communication with the discharge of the extruder 11, a rotor or die 15 defining an inlet 16, a periphery 17, and a centrally disposed projection 18. The rotor 15 is provided with a plurality of generally radially extending apertures or extrusion apertures 19 providing communication between the outer surface or periphery 17 and an internal cavity 21. The rotor 15 is supported by a shaft or mandrel 23 which in turn is rotated by a motor 24. The conduit 13 is adapted to discharge into the opening 16 of the rotor 15. A plurality of thermoplastic resinous particles 25 are shown issuing from the apertures or openings 19. An enclosuer 27 having a generally circular cross section is positioned radially surrounding the rotor 15. The enclosure 27 has a tangential gas or air inlet 28 and an internal surface 29 which defines a cavity 30. A discharge port 31 of the housing 27 is in commnication with a pump or forwarding means 32 by means of the line 34. The discharge of the pump 32 passes through the line 36 into a heat treating assembly generally designated by the reference numeral 38. The heat treating apparatus 38 comprises a housing 40 which in turn is divided into a heating portion 41 and cooling portion 42. About the heating portion 41 and adjacent the terminal portion of the line 36 is disposed a manifold or plenum 43 which is in communication with an interior passageway 45 of the housing 40 by means of a plurality of openings 47. The manifold 43 is in operative communication with a pump or gas forwarding device 46 by means of the line 48. Remotely disposed from the manifold 43 of the heating section 41 is a second manifold 48 which is in communication with the passageway 45 by means of the ports or apertures 49. The manifold 48 is in operative communication with a gas heater 51 by means of the line 52. A gas is forwarded to the heater 51 by means of a pump or gas forwarding means 54 through the line 55. Adjacent the heating section 41 and the cooling section 42 is disposed a manifold 58. The manifold 58 is in communication with the passageway 45 by means of the apertures or ports 60. A pump or gas forwarding device 61 is in operative communication with the manifold 58. A manifold 63 is remotely disposed from the manifolds 58 and 43. The manifold is in communication with the passage 45 by means of the ports or apertures 64. The manifold 63 is also in communication with the pump or gas forwarding device 65.

In FIGURES 2 and 3 there is illustrated two views of the rotor 15 more clearly illustrating its construction and arrangement.

The operation of the apparatus of the present invention will be described with reference to the drawing which is exemplary of one embodiment of the invention.

The thermoplastic resinous material in a heat plastified form is supplied to the rotor 15 from the extruder 11 through the conduit 13. The stream of thermoplastic resinous material contacts the projection 18 which serves to center the stream and promote even loading of the rotor. The rotor is driven by the motor 24 at a rate sufficient to cause melt fracture of the thermoplastic resinous material as it is forced through the openings 19. Melt fracture causes the material to issue as a plurality of small particles such as the particles 25. The particles impinge upon the wall 29 of the enclosure 27 after traveling through the atmosphere into space 30 and are cooled to a temperature sufficiently low that they do not adhere together. The particles are then drawn out of the enclosure 27 through the opening 31 into the pump 32 where they are discharged into the heat treating assembly 40. Beneficially air or other gas entering tangentially through the inlet 28 serves to cool the particles 25 to a temperature sufficiently low to prevent their adhering to the surface 29. Optionally the inlet 28 may be eliminated and a larger enclosure employed. A hot gas such as hot air enters the passageway 45 through the apertures 49 and is withdrawn by the manifold 43 or openings 47. The heated gas has a temperature sufficiently high to cause softening of any irregularities, that is, narrow projections on the polymer particles and cause them to sinter into a generally smooth configuration. As the hot air in the heating section 41 causes the surfaces of the particle to be generally molten, the cooling section 42 operating in a substantially similar manner with regard to the circulation of cold gas or air hardens the particles sufficiently that they may be collected in a hopper or other receiver.

The counter current flow in the heat treating assembly 40 provides an apparatus which requires less space than concurrent flow apparatus.

Generally in the practice of the operation of equipment in accordance with the present invention the rotor is operated at such a speed as to generate a force equivalent to 2,000 or more times the force of gravity on the material issuing from the rotor. The precise speed of rotation required varies with the melt viscosity of the thermoplastic resinous materials at the extrusion temperature. In turn the melt viscosity usually is temperature dependent. As the temperature of the polymer is raised the melt viscosity decreases rapidly and the force required for desired output and the force necessary to cause melt fracture decreases. Usually in order to induce melt fracture it is advantageous to employ a relatively short land length for the apertures in the rotor and generally provide a shoulder adjacent the land as illustrated in FIGURE 3. Such conditions induce turbulence in the stream of thermoplastic resinous material passing through the aperture and such turbulence in general promotes melt fracture. Other configurations of apertures can be formed to induce melt fracture. However, for most purposes the generally "square" entrance to the aperture is most economically fabricated. The particles or granules obtained generally have a length equal to or greater than the diameter and most often have length to diameter ratios between about 1:1 to 5:1. The thermoplastic resinous materials which are most prone to melt fracture are those having melt viscosities over about 2,000 centipoises. The upper limitation of viscosity is governed primarily by the mechanical strength of the rotor. If a thermoplastic material will flow under pressure and the tensile strength of the rotor is not exceeded and preferably for safety sake not approached, successful operation will result. Generally when the polymer has a melt viscosity below 2,000 centipoises under operating conditions discrete individual granule-like particles are not obtained, but elongated filaments are produced.

By way of further illustration, particles of polypropylene are prepared by utilizing a rotor generally as illustrated in the accompanying drawings which has a diameter of 12 inches, 24 symmetrically disposed apertures or passageways 0.060 inch in diameter, and having a length of 0.040 inch. Molten polypropylene at a temperature of 440° Fahrenheit is pumped at a rate of 40 pounds per hour to the rotor rotating at a speed of 3,600 revolutions per minute. The force exerted on the polymer to remove it from the extrusion aperture is about 2,200 times the force of gravity. Polypropylene particles are obtained generally in the form of prolate spheroids about 0.025 inch in diameter. Many of the particles had fine filamentary tails. The particles are subsequently passed through a heated atmosphere and a cooling atmosphere in a manner generally as illustrated in the treating unit of FIGURE 1 and the minor surface irregularities are removed and free-flowing particles of polypropylene obtained.

In a manner similar to the foregoing illustration a polypropylene having a melt index of 3 is treated in the same manner with the same equipment with the exception that the tempertaure of the molten polymer is 420° Fahrenheit. Substantially similar results are obtained. Apparatus generally as shown in FIGURE 1 has a rotor having a diameter of 4 inches and 30 extrusion apertures having a diameter of 0.20 inch and a length of .060 inch. The rotor is rotated at a speed of from about 15,000 to 18,000 revolutions per minute by means of an air turbine. A polyethylene having a melt index of 0.22 and a density of 0.944 is added to the rotor at a temperature range between about 480 and 490° Fahrenheit at a rate of 5 pounds per hour. Substantially similar results are obtained. When the foregoing illustration was repeated utilizing a polyethylene having a melt index of 20 and a polymer temperature of from about 400–450° Fahrenheit a production rate of 10–15 pounds per hour of finely divided particulate polyethylene was obtained.

When the foregoing apparatus is utilized with polymers such as polyvinyl chloride, polystyrene, copolymers such as those of styrene and acrylonitrile, polyolefins including the resinous copolymers of ethylene and propylene, nylon 66, a condensation product of hexaethylenediamine and adipic acid, polymethyl methacrylate, and the like similar beneficial results are obtained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. Apparatus adapted to manufacture particulate thermoplastic resinous material comprising in cooperative combination means to supply a continuous stream of a heat plastified thermoplastic resinous material, a rotor comprising a generally circular body defining an internal cavity, a plurality of circumferential passageways, the passageways providing a means of communication between the cavity and the periphery of the rotor, means to rotate the rotor at a speed sufficient to cause melt fracture of the thermoplastic resinous material when supplied to the cavity of the rotor in heat plastified form an enclosure containing the rotor, the enclosure so constructed and arranged so as to retain the particles of thermoplastic resinous material generated therein, means to forward particulate thermoplastic resinous material from the enclosure to a heat treating apparatus, the heat treating apparaus comprising in cooperative combination a heating zone adapted to receive the thermoplastic resinous material, heat the surface thereof to a molten state and cause contraction of the particles to a generally spherical form, a cooling zone adjacent to the heating zone, the cooling zone adapted to receive particles from the heating zone and cool the surfaces thereof below the thermoplastic temperature.

2. Apparatus in accordance with claim 1 wherein the enclosure is provided with a generally tangentially positioned gas inlet adapted to provide a generally circular flow of air about the periphery of the rotor and enclosure.

3. Apparatus of claim 1 wherein the heating and cooling zones are adapted to heat and cool the polymer by means of a counter current flow of gas at a suitable temperature.

References Cited by the Examiner

UNITED STATES PATENTS

| | | | |
|---|---|---|---|
| 1,352,623 | 9/1920 | Perry | 264—8 |
| 2,061,696 | 11/1936 | De Bats | 18—2.6 |
| 2,901,337 | 8/1959 | Keutgen et al. | 264—15 XR |
| 3,123,855 | 3/1964 | Fischer et al. | 18—2.7 |

ROBERT F. WHITE, *Primary Examiner.*

F. S. WHISENHUNT, J. R. HALL, *Assistant Examiners.*